United States Patent [19]
Frost

[11] 3,890,773
[45] June 24, 1975

[54] MOWER BLADE SUPPORT ASSEMBLY

[75] Inventor: Charles C. Frost, Newaygo, Mich.

[73] Assignee: C. L. Frost & Son, Inc., Grand Rapids, Mich.

[22] Filed: Dec. 12, 1973

[21] Appl. No.: 426,613

[52] U.S. Cl. .................. 56/255; 56/295; 74/230.3
[51] Int. Cl. .......................................... A01d 55/18
[58] Field of Search ...... 56/295, 6, 17.5, 255, 320.1, 56/320.2, 503; 74/230.3, 230.8, 230.01

[56] References Cited
UNITED STATES PATENTS

| | | | |
|---|---|---|---|
| 2,551,817 | 5/1951 | Taylor | 56/255 |
| 3,457,714 | 7/1969 | Kamlukin | 56/255 |
| 3,601,958 | 8/1971 | Roof | 56/6 X |
| 3,755,999 | 9/1973 | Meyer et al | 56/295 |

Primary Examiner—Louis G. Mancene
Assistant Examiner—J. N. Eskovitz
Attorney, Agent, or Firm—Price, Heneveld, Huizenga & Cooper

[57] ABSTRACT

An improved support assembly for the spindle housing in a rotary lawn mower includes a cone-shaped annular support member secured to the spindle housing. The support member is frusto-conical in configuration having angular sidewalls extending toward and fixed to the spindle mounting ring. The mounting ring secured to the spindle housing near its opposite end cooperates with the support member to provide two point support of the spindle on the deck of a rotary lawn mower.

11 Claims, 2 Drawing Figures

PATENTED JUN 24 1975　　　　　　　　　　　　　　3,890,773

MOWER BLADE SUPPORT ASSEMBLY

BACKGROUND OF THE INVENTION

This invention relates to a rotary mower and, more particularly to an improved spindle housing and deck support.

Rotary mower assemblies typically include a spindle housing equipped with a mounting ring or bracket extending radially outward from the housing and adapted to receive fasteners by which the mounting ring and spindle housing are attached to the deck of the mower. The spindle housing includes the drive shaft which has a drive pulley on one end (usually the upper) and the blade mounted on the lower end. The housing fits through an opening in the deck of the mower frame and extends some distance above and below the frame. In many cases, particulary in mowers having a large rotating blade, and more particularly in cases where the blade is positioned a substantial distance beneath the deck of the mower frame, metal fatigue and/or breakage is often experienced in the deck area of the mower. The momentary forces can become quite substantial during use when tall weeds and heavy grass is cut or if objects are struck during operation. Also, the constant vibrations involved transmit continual stresses and moments through the mounting bracket to the deck. The interface between the spindle housing and mounting bracket is typically welded and similarly susceptible to breakage and/or metal fatigue and/or bending. Thus, there is a particular need in the mower assembly art for an improved mower blade support assembly which reduces or eliminates previously encountered fatigue failure problems and bending in the area of attachment between the spindle housing and the mounting bracket.

SUMMARY OF THE INVENTION

The present invention overcomes the difficulties encountered in the prior art of design of a fabricated spindle by a significant and yet relatively inexpensive improvement upon the means for connecting the spindle housing to the deck of a rotary lawn mower. More specifically the mounting arrangement of the present invention includes a first ring-like mounting member secured to the spindle near one of its ends and extending outwardly therefrom. The outer peripheral edge of the ring-like member is adapted for abutment with and securement to the deck of the lawn mower. A support member spaced from the mounting member is secured to the spindle housing near its opposite end. One of the mounting member and support member are preferably secured intermediate the ends of the housing. The support member has outwardly, angularly extending sidewalls which extend from the spindle outwardly and upwardly toward the peripheral edge of the mounting member. The support member is adapted for securement with the mounting member to the deck of the lawn mower to thereby support the spindle housing at two spaced apart points along its length. The structural integrity of the mounting arrangements for the spindle housing is thereby significantly improved. Those skilled in the art will recognize that the spindle housing mounting arrangement of the invention is inexpensive, can be assembled with a minimum of labor, is sturdy in construction and is not susceptible to breakage problems of the prior art. The many features and additional advantages of this invention will become readily apparent to those skilled in the art from a consideration of the following description when taken in connection with the accompanying drawings.

DESCRIPTION OF THE PREFERRED EMBODIMENT

Figure 1:
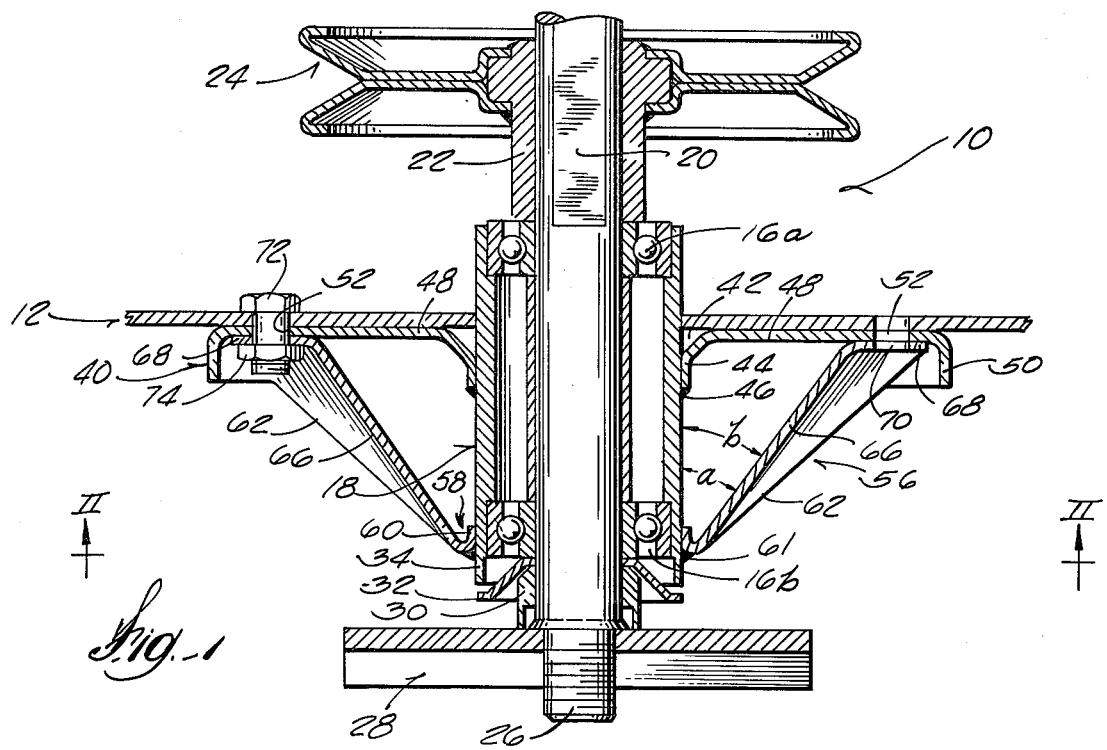
FIG. 1 is a cross-sectional view of the spindle housing and mounting means of the invention.
Figure 2:
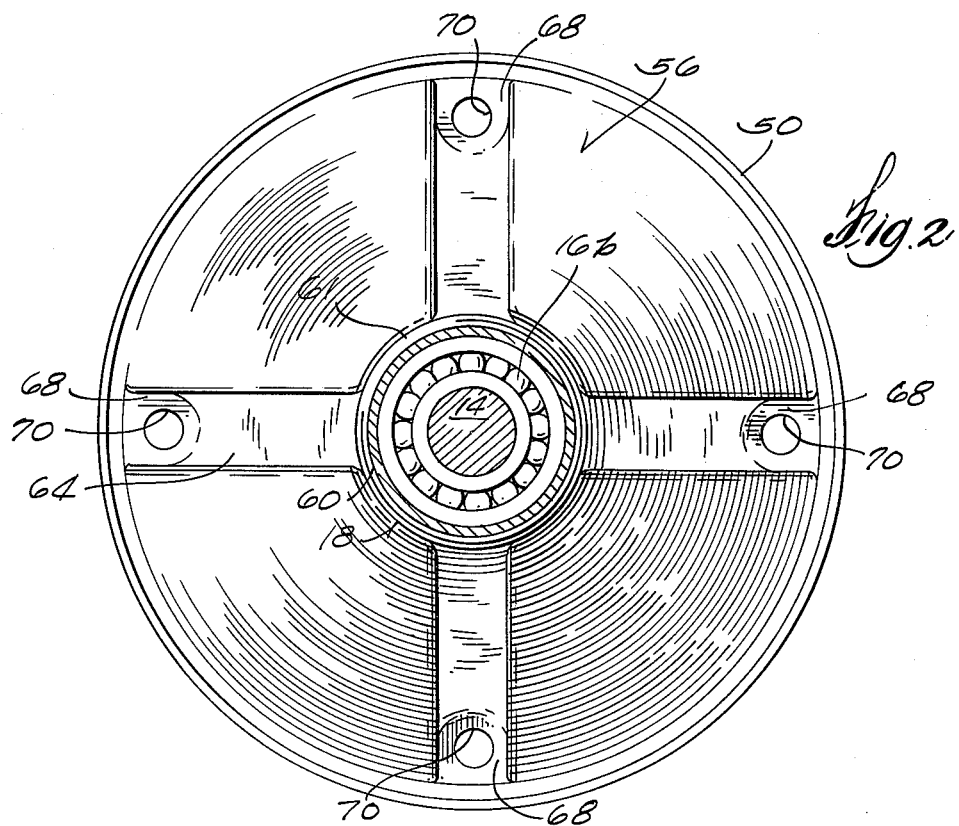
FIG. 2 is a cross-sectional view taken generally along the plane II—II of FIG. 1 illustrating the mounting means in plan view.

Referring now to the drawings, the improved spindle housing support assembly generally designated by the numeral 10, is adapted for mounting on the deck 12 of a rotary lawn mower. A shaft or spindle 14 is journaled for rotation by means of bearings 16a and 16b contained within an elongated spindle housing 18. The spindle housing includes, a mounting ring 40 by which it is mounted to the deck 12 of the lawn mower. The ring 40 is fixed to the spindle housing and extends radially outwardly. A supporting ring 56, also secured to the deck 12, includes conical wall surfaces 62 tapering inwardly and downwardly from the deck where the central portion thereof is secured to the housing near its blade supporting end. The mounting ring and supporting ring are spaced apart on the housing and commonly cooperate to join the housing to the deck to thereby provide a rigid two point support.

The upper end 20 of shaft 14 is adapted to receive the hub 22 of a welded pulley assembly 14. The lower end 26 of shaft 14 is equipped with a saddle assembly 28. Saddle 28 is welded to an annular shoulder formed on the shaft 14 and includes a spacer 30 and shield 32 to cooperatively space the saddle 28 from the lower end 34 of the spindle housing. The welded shaft and saddle assembly including spacer 30 and shield 32 forms no part of the present invention and is described in detail in commonly assigned U.S. Pat. No. 3,847,455 entitled MOWER BLADE SADDLE ASSEMBLY issued Nov. 12, 1974. Similarly, pulley 24 including its welded hub 22 may be constructed in accordance with the teachings of commonly assigned co-pending application Ser. No. 199,983, filed Nov. 18, 1971, entitled ROTATABLE MEMBER ASSEMBLY AND METHOD OF MAKING SAME. Various types of conventional pulley and spindle assemblies may be utilized however.

The annular mounting ring 40 has a central opening 42 formed therein by an inwardly turned annular central flange 44. Flange 44 is welded at 46 to spindle housing 18 at a point generally intermediate its ends. Mounting ring 40 includes a generally flat planar wall surface 48 extending radially outwardly from central flange 44 and terminating in an outer peripheral annular flange 50. A plurality of spaced apart openings 52 are provided in wall 48 adjacent flange 50 to cooperatively receive fastening means by which the mounting ring and spindle housing is secured to deck 12.

Support member 56 is frusto-conical in shape having a central opening 58 formed at its smaller end. Opening 58 is formed with a central flange or annular neck 60 surrounding the outer diameter of spindle housing 18 and secured thereto by an annular weld 61. It will be appreciated that while the weldment of neck 60 to housing 18 is preferred, it need not be positively secured thereto. Preferably the support member 56 is drawn or stamped from sheet metal so as to include central flange 60 and outwardly upwardly depending angular sidewalls 62 which extend outwardly to a radial diameter just slightly smaller than the inner diameter defined by flange 50 of mounting ring 40. Sidewalls 62 are formed with a plurality of spaced apart detents or ribs 64. The ribs include a back wall surface 66 extending from flange 60 at an angle *a* with repsect to the vertical (defined by spindle housing 18) slightly less than the angle *b* of sidewalls 62. Ribs 64 terminate at their outer end in flattened areas or mounting pads 68. Openings 70 in pads 68 correspond to openings 52 in wall surface 48 of mounting ring 40. Mounting pad 68 abuts the lower face of wall 48 and in cooperation therewith is mounted to deck 12 by means of bolts 72 and nuts 74.

Mounting ring 40 and support member 56 are therefore seen to be fixed to spindle housing 18 at two spaced apart points to thereby hold the spindle, bearings, and the spindle housing in perfect perpendicular relationship with respect to deck 12. The angle of the walls of support member 56 also tends to absorb previously experienced moment forces in compression thereby significantly increasing the overall strength of the assembly. The combined welded spindle housing, mounting ring and support member cooperatively provided a strong integral spindle mounting assembly in which the fatigue, bending and breakage problems of the prior art are entirely eliminated. The construction of the mounting is relatively inexpensive both in cost of the materials and in the labor involved in assembly. The need for heavy machined castings has been entirely eliminated thereby markedly reducing the cost of the mounting assembly.

Those skilled in the art will immediately recognize that the spindle mounting arrangements known in the prior art have been significantly improved upon by the teachings of the present invention. Thosse skilled in the art will also appreciate that many modifications may be made and it is therefore intended that the equivalent arrangements are to be included as part of this invention unless the following claims by their wording expressly state otherwise.

The embodiments of the invention is which or exclusive property or privilege is claimed are defined as follows:

1. A spindle housing and support assembly for a rotary mower comprising, in combination: a tubular spindle housing having means for receiving and supporting spaced bearing means for rotatably supporting a spindle to a rotary mower deck, a first support member having a central opening for receipt of said housing, said spindle housing being interconnected to said first support member at said central opening, said first member having a surface thereon adapted to extend outwardly from said housing and further adapted for securement to the deck of a lawn mower, and a second member likewise having a central opening for receipt of said housing, said housing being interconnected to said second member at said central opening, one of said first and second members being interconnected to said spindle housing intermediate said spindle housing means, said second member having a portion spaced from said first member and having wall means extending outwardly therefrom, said wall means extending from said housing to said surface of said first member and adapted for securement therewith to the deck of the lawn mower, said first and second member forming an annular stiffening and support housing about said spindle housing to anchor and support said spindle housing to a rotary mower deck.

2. The apparatus of claim 1 wherein said first and said second members extend radially outwardly from said spindle housing, each of said members having a central opening to receive said spindle housing and wherein said spindle is welded to said first and said second members at said central openings.

3. The support member of claim 2 wherein said second member is frusto-conical in configuration, the small end thereof having said central opening formed therein at said portion.

4. The support member of claim 3 wherein said outwardly extending wall means of said second member includes a plurality of stiffening ribs formed therein, said ribs extending from said portion at an angle with respect to said spindle housing, said angle being less than the angle of said wall means, the small end thereof being fixed to said housing, said wall means extending outwardly therefrom and terminating at its base in a peripheral flange, said flange being adapted for securement with said mounting means to the lawn mower deck.

5. The support member of claim 4 wherein said spindle housing includes bearing means at the ends thereof to rotatably support a spindle, said first member being secured to said housing intermediated said ends and wherein said second member is secured to said housing proximate one of said ends.

6. The improved support assembly of claim 5 wherein the end of the spindle journaled in said housing adjacent said one end of said housing is adapted to support a blade member, said second member extending radially outwardly and upwardly from said one end.

7. In a rotary mower drive assembly including an elongate spindle housing, spaced bearing means secured in said housing, a spindle journaled for rotation in said bearings, and mounting means extending from said housing for mounting said housing and said spindle to a lawn mower deck; the improvement comprising:
a support fixed to said housing, said support being spaced from said mounting means along the length of said spindle housing; wall means on said support member extending angularly outwardly from said housing and into abutment with said mounting means for securement therewith to said lawn mower deck, one of said support and mounting member being secured to said housing intermediate said spaced bearing means.

8. The improvement of claim 7 wherein said support includes a hollow frusto-conical member surrounding said housing, intermediated said ends and wherein said second member is secured to said spindle proximate one of said ends.

9. Apparatus for supporting a spindle housing having spaced bearing means on the deck of a rotary mower comprising: a pair of members fixed to said housing one of said members being fixed to said housing intermediate the bearing means a perdetermined distance along the length of said housing from the other of said members, said one of said members being generally disk-shaped and having a surface extending radially outwardly from said housing, said surface adapted for securement to said deck, the other of said member being generally cone-shaped, the sidewall surfaces thereof extending outwardly from said housing toward said surface of said one of said members, said wall having means formed at the periphery thereof abutting said surface for securement therewith to said deck to thereby secure said housing generally perpendicular thereto.

10. The support of claim 9 wherein said wall surfaces of said other of said members includes a plurality of ribs formed therein, said ribs forming said means abutting said surface.

11. The support of cliam 9 wherein said pair of members are formed from sheet metal, each said member having an annular flange formed in the central portion thereof embracing said housing and wherein said housing is welded to said members at said flange.

* * * * *

UNITED STATES PATENT AND TRADEMARK OFFICE
CERTIFICATE OF CORRECTION

PATENT NO. : 3,890,773
DATED : June 24, 1975
INVENTOR(S) : Charles C. Frost

It is certified that error appears in the above-identified patent and that said Letters Patent are hereby corrected as shown below:

Column 3, line 59; delete "interconnected to" and insert --- supported by ---;

line 61; delete "being interconnected to" and insert --- supporting ---;

line 62; after "said" insert --- means for receiving and supporting spaced bearing means ---;

line 62; delete "spindle housing" (second occurrence)

line 63; delete "means";

Column 4, line 43; delete "fixed to" and insert --- for supporting ---;

line 50; delete "being secured to" and insert --- supporting ---.

Signed and Sealed this fourth Day of November 1975

[SEAL]

Attest:

RUTH C. MASON
Attesting Officer

C. MARSHALL DANN
Commissioner of Patents and Trademarks